3,403,042
PROCESS OF COATING ELECTRICALLY NON-CONDUCTING FILMS WITH AN ORGANIC HEAT-SEALABLE POLYMER COATING CONTAINING AN ETHANOLAMINE SALT AND THE COATED FILM

Brian Douglas Stead, St. Albans, England, assignor to Imperial Chemical Industries Limited, London, England, a corporation of Great Britain
No Drawing. Filed Apr. 23, 1965, Ser. No. 450,524
Claims priority, application Great Britain, Apr. 12, 1965, 18,640/65
15 Claims. (Cl. 117—7)

ABSTRACT OF THE DISCLOSURE

An electrically non-conducting film coated with an organic thermoplastic heat-sealable homopolymer or copolymer of a monoethylenically unsaturated monomer, the coating containing an ethanolamine salt of a fatty alcohol sulphate present in sufficient amount whereby the surface resistivity of the coated film is no greater than $1 \times 10^{14}$ ohm cm./cm. The film may be, for example, polypropylene or polyethylene terephthalate and the polymer may be a copolymer of vinylidene chloride and acrylonitrile. The salt may be, for example, a mono-, di- or tri-ethanolamine salt of a sulphuric acid ester of an alkanol containing from 8–22 carbon atoms.

---

This invention relates to electrically non-conducting films coated with organic thermoplastic heat seal coatings. By electrically non-conducting films is meant films which accumulate electrostatic charges on their surfaces. This accumulation results in undesirable dust pick-up on the film surfaces and also causes problems in the use of the films when they are passed through packaging machinery. Such films include polyethylene terephthalate and similar polyester films, vinylidene chloride copolymer films, and films of crystallisable polymers or copolymers of α-olefines including ethylene having preferably between two and six carbon atoms in the molecule, particularly polythene films and films made from polymers and copolymers of propylene where the propylene is at least 75% insoluble in boiling n-heptane, e.g. isotactic polypropylene. The invention also relates to processes of making such films and articles of manufacture made from them.

An object of the present invention is to reduce the dust pick-up of such films. Other objects will appear hereinafter.

This invention provides an electrically non-conducting film coated with an organic thermoplastic heat sealable polymer or copolymer of a mono-ethylenically unsaturated monomer, said coating containing an ethanolamine salt of a fatty alcohol sulphate present in sufficient amount whereby the surface resistivity of the coated film is no greater than $1 \times 10^{14}$ ohm cm./cm. We prefer that its surface resistivity is no greater than $4 \times 10^{10}$ ohm cm./cm. in order that the coated film can be used satisfactorily on packaging machinery.

Preferably the coating also contains a slip agent and/or anti-blocking agent, coated films having the most useful combination of low blocking characteristics and low coefficient of friction combined with anti-static properties being thereby obtained.

The invention also provides a process for the preparation of our coated films in which an electrically non-conducting film is coated with an aqueous dispersion of an organic thermoplastic heat-sealable polymer or copolymer of a mono-ethylenically unsaturated monomer, said dispersion containing an ethanolamine salt of a fatty alcohol sulphate present in sufficient amount whereby the coated film, after drying off the water, has a surface resistivity no greater than $1 \times 10^{14}$ ohm cm./cm., preferably no greater than $4 \times 10^{10}$ ohm cm./cm.

Suitable ethanolamine salts useful in our invention include the mono-, di- and tri-ethanolamine salts of mineral acid esters, preferably sulphuric acid esters of alkanols containing from 8 to 22 carbon atoms inclusive. For best effect they should be present in amount of from 1 to 5%, preferably from 1.5 to 3%, by weight of the heat sealable polymer or copolymer. It is preferred to use less than 3% as otherwise there is a tendency for the coating to have an undesirable ribby appearance.

As the heat sealable coatings there may be used, for instance, copolymers of vinylidene chloride with other monomers, such as acrylonitrile, methyl or ethyl acrylates, vinyl chloride, acrylic acid and methacrylic acid and vinyl acetate. Among such copolymers vinylidene chloride/acrylonitrile copolymers (e.g. 80 to 95%/20 to 5% respectively which may contain in addition, up to 5% of acrylic acid) have been found to give particularly useful seals and may be readily applied as dispersions to films such as polyethylene terephthalate film and to polypropylene film which will normally require first to undergo a known surface activation treatment to improve its adhesion to coatings, as hereinafter described. Other heat sealable coatings which may be used include polyvinyl alcohol, polyvinyl acetate; polyvinyl acetals, such as polyvinyl butyral; copolymers of vinyl acetate with vinyl chloride or vinyl propionate; and copolymers of methyl methacrylate and methacrylic acid.

The heat sealable coatings are applied to the film from an aqueous dispersion, for instance, by applying them with coating rolls, the coating then being dried off on the film. It is useful to apply the coating to an oriented but not heat set polyolefin or polyethylene terephthalate film and then to heat set it, e.g. in a stenter, while drying off the coating. The coating may also be applied to non-oriented films which may then if desired be stretched to orient them.

Where the base film used is a polyolefine film, it is preferable to activate the surface to improve the adhesion of the heat sealable coating polymer, for instance, to subject it to a spark discharge treatment, or to chemical oxidising agents such as halogens, potassium permanganate and chromic acid, followed if desired by the deposition of an anchor layer comprising for instance a thermosetting resin as described and claimed in our specification No. 932,652.

If desired, a slip agent may be used which may be any comminuted solid which is insoluble in the synthetic organic polymer coating, for instance, starch, talc, zinc oxide, calcium carbonate, magnesium carbonate, diatomaceous earths such as "Superfloss," silica, kaolin, titanium oxide, triferric tetroxide and other inorganic oxides, carbonates, silicates, aluminates and alumina-silicates. Finely dispersed polymers such as polypropylene and polyvinyl chloride may also be used. In all cases the particle size of the slip agent should be in the range 0.1 to 20 microns, and preferably for best effect in the range 0.2 to 5 microns. As anti-blocking agent there may be used, for example, a waxy additive, such as the unsaturated fatty acid amides and saturated fatty acid amides such as palmitamide, stearamide, distearamide and alkylene distearamides such as methylene and ethylene distearamides; hydroxylated fatty acid amides such as hydroxy stearamide, hydrogenated castor oil, ester type waxes, ether waxes and other hard waxes.

The coatings may also contain other additives such as anti-oxidants, dyes and pigments and ultra-violet light stabilisers.

Our invention is illustrated by the following examples in which parts given are by weight.

Example 1

A biaxially oriented and heat set polypropylene film 0.0005 inch thick which had been subjected to a spark discharge treatment and coated with an anchor coat comprising a butylated melamine formaldehyde resin was overcoated by gravure rolls with an aqueous dispersion of a vinylidene chloride-acrylonitrile (88:12) copolymer (40% solids content w./w.) containing 3% by weight of solids of mono-ethanolamine lauryl sulphate. The top coats were dried off in a stenter at 110° C. and were 0.00006 inch thick. The coated film had a surface resistivity of $2 \times 10^9$ ohm cm./cm.

Examples 2 to 6

A biaxially oriented and heat set polyethylene terephthalate film, 0.0005 inch thick, was coated by gravure rolls with an aqueous dispersion of a vinylidene chloride-acrylonitrile (88:12) copolymer (40% solids content w./w.) containing a predetermined amount of mono-ethanolamine lauryl sulphate (emulsifier). The experiment was repeated using different amounts of emulsifier in the dispersion. The coatings were applied at a coating speed of 20 ft./minute and were dried off at different oven temperatures (as indicated below), the dwell time in the oven being 40 seconds in every case.

Coatings 0.00006 inch thick, when dry, were obtained in each experiment.

The same procedure was followed but using, as heat seal coating dispersion, an aqueous dispersion of a vinylidene chloride-methyl acrylate (92:8) copolymer (40% solids content w./w.) and different proportions of emulsifier.

Surface resistivities of the coated films thereby obtained are reported below.

| Dispersion used | | Parts of emulsifier, w./w. on dispersion solids | Surface Resistivity (ohm cm./cm.) | | |
|---|---|---|---|---|---|
| | | | Coat drying temperature | | |
| | | | 80° C. | 100° C. | 120° C. |
| Example 2 | Vinylidene chloride-acrylonitrile copolymer | 1.75 | $0.43 \times 10^{10}$ | $0.52 \times 10^{10}$ | $0.46 \times 10^{10}$ |
| Example 3 | do | 2.75 | $0.3 \times 10^{10}$ | $1.9 \times 10^9$ | $1.7 \times 10^9$ |
| Example 4 | do | 3.75 | $1.30 \times 10^9$ | $0.94 \times 10^9$ | $0.78 \times 10^9$ |
| Example 5 | Vinylidene chloride-methyl acrylate copolymer | 2.65 | $5.1 \times 10^8$ | $5.8 \times 10^8$ | $4.2 \times 10^8$ |
| Example 6 | do | 3.65 | $3.2 \times 10^8$ | $2.7 \times 10^8$ | $3.5 \times 10^8$ |

I claim:

1. An electrically non-conducting film coated with an organic thermoplastic heat-sealable polymer selected from the group consisting of hompolymers and copolymers of a mono-ethylenically unsaturated monomer, said coating containing an ethanolamine salt of fatty alcohol sulphate present in sufficient amount whereby the surface resistivity of the coated film is no greater than $1 \times 10^{14}$ ohm cm./cm.

2. A process in which an electrically non-conducting film is coated with an aqueous dispersion of an organic thermoplastic heat-sealable polymer selected from the group consisting of hompolymers and copolymers of a monoethylenically unsaturated monomer, said dispersion containing an ethanolamine salt of a fatty alcohol sulphate present in sufficient amount whereby the coated film, after drying, has a surface resistivity no greater than $1 \times 10^{14}$ ohm cm./cm.

3. A process according to claim 2 in which the ethanolamine salt is selected from the group consisting of mono-, di- and tri-ethanolamine salts of a mineral acid ester.

4. A process according to claim 3 in which the ethanolamine salt is selected from the group consisting of mono-, di- and tri-ethanolamine salts of a sulphuric acid ester of an alkanol containing from 8 to 22 carbon atoms inclusive.

5. A process according to claim 4 in which the ethanolamine salt is present in amounts of from 1 to 5% by weight of the heat-sealable polymer.

6. A process according to claim 5 in which the ethanolamine salt is present in amounts of from 1.5 to 3% by weight of the heat-sealable polymer.

7. A process according to claim 2 in which the heat-sealable copolymer is a copolymer of vinylidene chloride with another monomer.

8. A process according to claim 7 in which the other monomer is acrylonitrile present in amounts from 5 to 20% by weight of the copolymer.

9. A process according to claim 8 in which the non-conducting film is polypropylene.

10. A process according to claim 2 in which the non-conducting film is polyethylene terephthalate.

11. A process according to claim 2 in which the non-conducting film is polyethylene terephthalate.

12. A process according to claim 2 in which the coating is applied to an oriented film.

13. A process according to claim 2 in which the coating is applied to an unoriented film and the film is subsequently stretched to orient it.

14. A process according to claim 2 in which a slip agent is incorporated in the coating.

15. An electrically non-conducting film selected from the group consisting of biaxially oriented and heat set polypropylene and polyethylene terephthalate films coated with a thermoplastic heat-sealable vinylidene chloride/acrylonitrile copolymer, the acrylonitrile comprising 5–20% by weight of the copolymer and said coating containing from 1.5 to 3% by weight, based on the weight of copolymer, of mono-ethanolamine lauryl sulphate.

References Cited

UNITED STATES PATENTS

| | | | |
|---|---|---|---|
| 3,108,017 | 10/1963 | Messwarb et al. | 117—138.8 |
| 3,262,808 | 7/1966 | Crooks et al. | 117—47 |
| 3,285,766 | 11/1966 | Barkis et al. | 117—138.8 X |
| 3,322,553 | 5/1967 | Siefried et al. | 117—138.8 X |
| 2,519,013 | 8/1950 | Banigan | 117—138.8 |
| 2,678,285 | 5/1954 | Browning | 117—138.8 |
| 2,779,684 | 1/1957 | Alles | 117—138.8 |
| 2,824,023 | 2/1958 | Banigan | 117—138.8 |
| 2,832,697 | 4/1958 | Walles | 117—138.8 |
| 3,058,939 | 10/1962 | Meier | 117—138.8 |
| 3,245,905 | 4/1966 | White et al. | 117—138.8 |

WILLIAM D. MARTIN, *Primary Examiner.*

T. G. DAVIS, *Assistant Examiner.*